(12) United States Patent
Lavezzi et al.

(10) Patent No.: US 8,276,477 B2
(45) Date of Patent: Oct. 2, 2012

(54) COLLAPSIBLE CONTROL LEVER DEVICE

(75) Inventors: Roberto Lavezzi, Brembate Di Sopra (IT); Gianangelo Pezzotta, Verdello (IT); Marcello Colombo, Monza (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 1313 days.

(21) Appl. No.: 11/722,819

(22) PCT Filed: Dec. 30, 2004

(86) PCT No.: PCT/IT2004/000740
§ 371 (c)(1),
(2), (4) Date: Jun. 26, 2007

(87) PCT Pub. No.: WO2006/070417
PCT Pub. Date: Jul. 6, 2006

(65) Prior Publication Data
US 2007/0283774 A1    Dec. 13, 2007

(51) Int. Cl.
*F16C 1/10*    (2006.01)
(52) U.S. Cl. ................................ 74/502.2
(58) Field of Classification Search ............ 74/502.2, 74/523, 524, 525, 501.6; 180/218, 219
See application file for complete search history.

(56) References Cited

U.S. PATENT DOCUMENTS

| | | | | |
|---|---|---|---|---|
| 3,368,421 | A | * | 2/1968 | Hass et al. ............... 74/493 |
| 4,730,509 | A | | 3/1988 | Hornady |
| 6,393,936 | B1 | | 5/2002 | Barnett |
| 6,739,133 | B2 | | 5/2004 | Barnett |
| 7,503,237 | B2 | * | 3/2009 | Cornolti et al. ............. 74/525 |
| 2003/0205102 | A1 | | 11/2003 | Barnett |

* cited by examiner

*Primary Examiner* — Thomas R Hannon
*Assistant Examiner* — Alan Waits
(74) *Attorney, Agent, or Firm* — Shoemaker and Mattare

(57) ABSTRACT

A control device such as a handlebar-mounted brake includes a support structure containing a hydraulic piston, a lever pivotally connected to the support structure by a pin, and a transmission element for transmitting force from the lever to the piston during a normal actuation stroke of the lever. The lever may pivot outward substantially beyond its normal rest position. A torsion spring biases the lever in the actuation direction so that the lever and the transmission element are normally in contact. However, in the event of a fall, the lever can pivot outward from its normal rest position, out of contact with the transmission element. The hydraulic components are thereby protected from damage, as the pin and support structure bear the entire impact force applied to the lever.

10 Claims, 3 Drawing Sheets

COLLAPSIBLE CONTROL LEVER DEVICE

FIELD OF INVENTION

The present invention relates to control lever devices for vehicles, particularly to a collapsible lever device for motorcycles.

BACKGROUND OF THE INVENTION

In motorcycles, the brake and clutch are manually actuated by means of a lever device that is mounted on the handlebar of the motorcycle, a hydraulic tube extending therefrom to the system to be controlled, such as a hydraulically actuated brake or a clutch.

The lever of the lever device is usually arranged on the grip of the handlebar and the motorcyclist, in order to actuate the lever, grips the handlebar together with the lever and clenches the hand such as to rotate the lever towards the grip. The movement of the lever produces a thrust force acting on the hydraulic piston, the stroke or position thereof defining the amount of fluid pressure inside said hydraulic pipe for controlling the brake or clutch.

Since these levers are the outermost and most exposed part of the motorcycle, the end of the lever can more or less awkwardly hit the ground upon falling, thereby causing the breakage or deformation either of the lever or its support as well as the handlebar-fixing structure.

A broken lever makes a clutch or a manual brake unserviceable, and is accordingly a serious damage that prevents the motorcyclist from continuing a ride or a race.

In order to overcome the problem of accidental failure of the control lever, there has been proposed, for example in the patent U.S. Pat. No. 6,739,133 B1, a lever device provided with a support structure, a transmission portion and a lever being pivotally connected thereto. The transmission portion is always in contact with the hydraulic piston and can be rotated between two extreme angular positions defining an angular actuation stroke therebetween. The first extreme angular position is defined by the abutment of a stop surface of the transmission portion against a corresponding stop surface of the support structure and corresponds to a rest position both for the hydraulic piston and the lever. The second extreme angular position of the transmission portion corresponds to a more or less forward actuation position of the hydraulic piston, based on the force being applied on the lever and transmitted to the transmission portion therefrom.

The lever is pivotally connected to the transmission portion or, alternatively, the lever and transmission portion are connected to each other and the support structure by means of an individual pin allowing them to rotate relative to each other.

The rotation of the lever relative to the transmission portion is restricted in a first direction of rotation due to a lever stop surface abutting against a corresponding stop surface of the transmission portion, such that the lever can rotate the transmission portion in order to advance the hydraulic piston, and thereby actuating the brake or clutch. In the opposite direction to the actuation of the brake or clutch, the lever is freely rotatable such that the same may collapse without breaking in the event of impact. A torsion spring holds the lever elastically in the rest position against the transmission portion in order to prevent that the lever may swing in an uncontrolled manner. A device of this type is depicted in FIG. 1.

This solution, though reducing a lot the risk of failure of the lever, has a disadvantage in that impacts, particularly those transversal to the rotational plane of the lever, are directly (and in an amplified manner, due to the effect of the lever) transmitted to the transmission portion, thereby causing the deformation or breakage of this transmission portion and, at worst, damaging the hydraulic piston against which the transmission portion abuts. Besides seriously impairing the use of the motorcycle after a fall, these damages require subsequent costly servicing if not the replacement of the whole lever device.

The object of the present invention is therefore to improve the control lever device of the prior art such as to further diminish possible damages to the transmission portion and the hydraulic piston due to the impacts against the lever.

BRIEF DESCRIPTION OF THE INVENTION

This and other objects are achieved by means of a control lever device for vehicles comprising:
  a support structure with means for connecting the device to a handlebar;
  a cylinder-piston unit being connected to the support structure;
  a lever being pivotally connected to the support structure along an angular actuation stroke extending from an angular rest position of the lever in a first direction of rotation and along an angular collapse stroke extending from said angular rest position in a second direction of rotation, opposite the first direction;
  a transmission portion being associated with the lever device such as to transmit the movement of the lever along the angular actuation stroke to the cylinder-piston unit,
  wherein the transmission portion is arranged relative to the lever such that, when the lever is in the angular collapse stroke, the lever is separated from the transmission portion.

BRIEF DESCRIPTION OF THE FIGURES

In order to better understand the invention and appreciate the advantages thereof, an embodiment thereof will be described below by way of non-limiting example, with reference to the annexed drawings, in which.

DETAILED DESCRIPTION OF EMBODIMENTS

Figure 1:
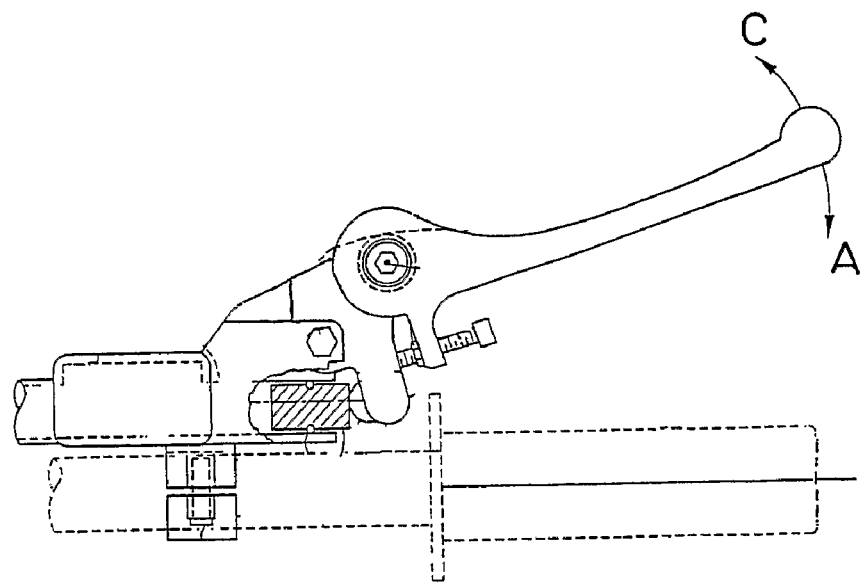
FIG. 1 illustrates a control lever device of the prior art.
Figure 2:
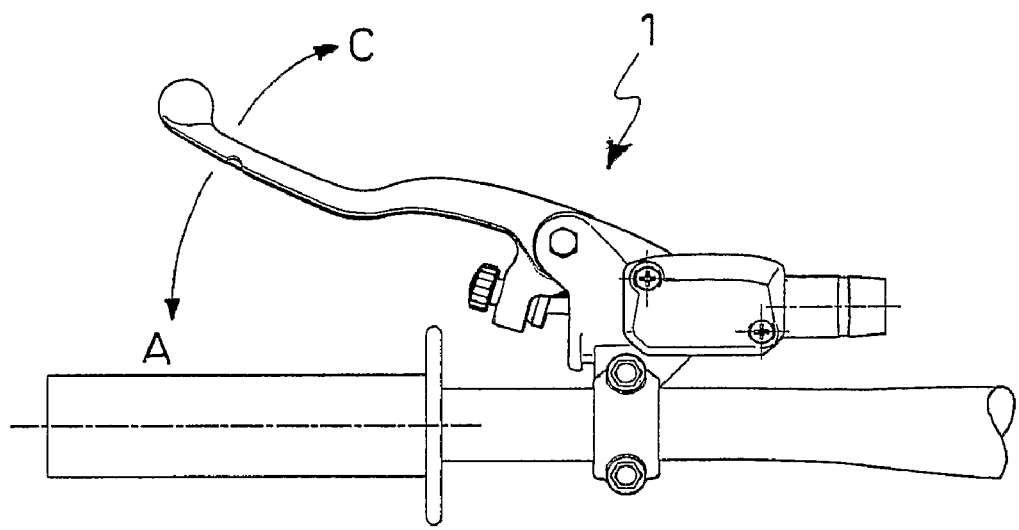
FIG. 2 is a perspective view of an embodiment of the device according to the invention.
Figure 3:
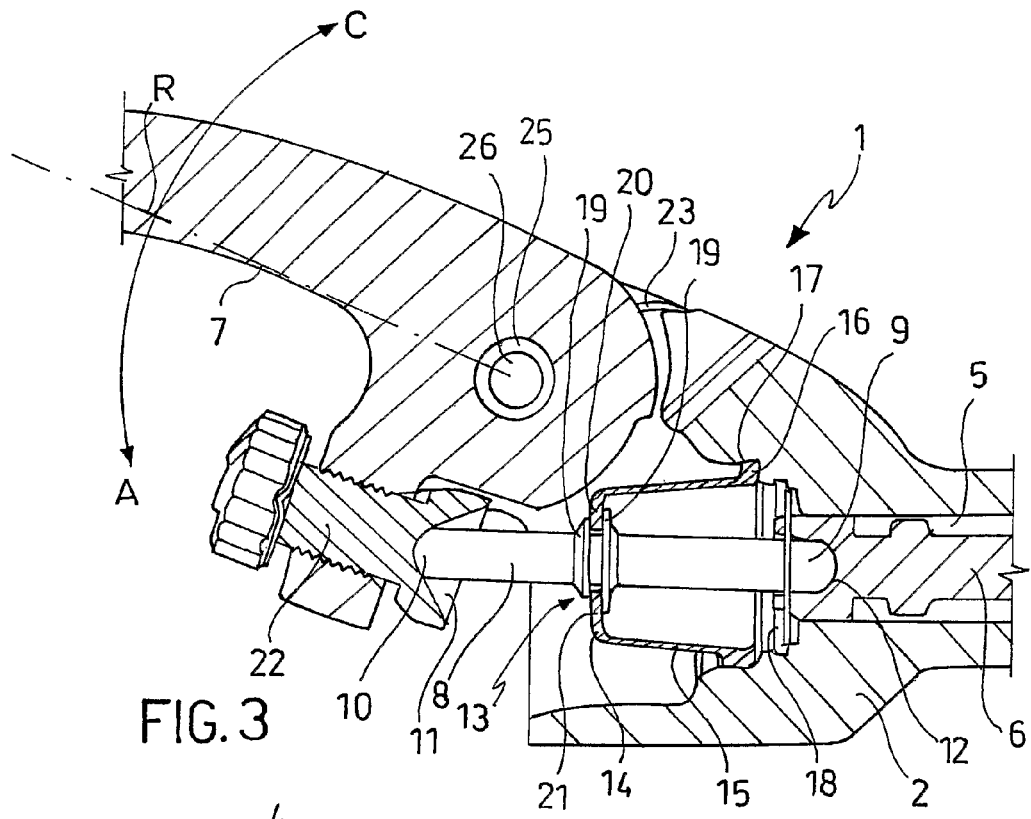
FIGS. 3 and 4 are sectional views of several details of the device from FIG. 2.

With reference to the FIGS. 2 to 7, a control lever device is generally designated with 1.

The device 1 comprises a support structure 2 with means for connecting the device 1 to a handlebar, for example one or more tightening portions 3 provided with suitable holes 4 that are optionally threaded to house clamping screws. To the support structure 2 there is connected a cylinder-piston group, for example in the form of a cylinder-piston unit that is manufactured separate from the support structure and subsequently connected thereto, or, as shown in the figures, a cylindrical housing 5 being directly made in the support structure 2 that slidingly houses a piston 6. A lever 7 is pivotally connected to the support structure 2 along an angular actuation stroke A extending from an angular rest position R of lever 7 in a first direction of rotation and along an angular collapse stroke C extending from said angular rest portion R in a second direction of rotation opposite the first direction of rotation. A transmission portion 8 is associated with the device 1 such as to transmit the movement of lever 7 along the angular actuation stroke A to the cylinder-piston unit, particularly to piston 6. The transmission portion 8 is arranged relative to lever 7 such that, when the lever 7 is in the angular collapse stroke C, it is separated from the transmission portion 8 meaning that a force applied on lever 7 cannot be transmitted therefrom by direct contact to the transmission portion 8 or, in other words, a force applied on the lever is directly transmitted and, preferably exclusively, to the support structure 2, thus bypassing the transmission portion 8.

When the lever 7 is in the angular actuation stroke A, it abuts against the transmission portion 8 to allow the transmission of the movement of lever 7 to the cylinder-piston unit, particularly to piston 6, in order to actuate either the brake or clutch.

In accordance with an embodiment, the transmission portion 8 is provided as an elongated push rod having a preferably circular cross-sectional shape. The push rod has a first end 9 that is held into permanent contact to a seat 2 of piston 6 and a second end 10 that is free and suitable to abut against a suitable seat 11 of the lever 7, when the latter is in the angular actuation stroke A.

Advantageously, the connection of the transmission portion 8 to the support structure 2 is provided in a position away from the position of a pin 26 providing the pivotal connection of lever 7 to the support structure 2. Due to the distance between the pin 26 and the transmission portion 8, any stroke or impact on the lever 7 is counteracted only by the support structure 2 (which is usually very solid) without damaging the transmission portion 8.

The transmission portion 8 comprises, in an intermediate area between the first end 9 and the second end 10, a connecting portion 13 for the connection of the transmission portion 8 to a gasket 14 being provided for protecting the cylinder-piston unit from the external environment.

Advantageously, the gasket 14 has the shape of a cup with a smooth or bellows side wall 15. The circumferential edge 16 of the open side of gasket 14 is inserted in a suitable seat 17 being formed all around an opening 18 through which the transmission portion 8 extends from the outside into the seat 12 of piston 6.

Preferably, the connecting portion 13 of the transmission portion 8 is a circumferential groove formed by two parallel circumferential flanges 19, suitable to house a preferably circular edge 20 of an opening formed in a bottom wall 21 of the gasket 14 opposite the open side thereof.

In accordance with an embodiment, the gasket 14 is made of an elastomeric or elastic material and is formed and positioned such as to hold the transmission portion 8, i.e. the push rod, elastically in a preset position at least when lever 7 is in the angular collapse stroke.

To said seat 11 of lever 7 against which there abuts the second end 10 of the transmission portion 8 there are associated adjusting means suitable to adjust the relative position of the seat 11 and the lever 7, such as to be able of adjusting the angular rest position of the lever 7 according to the user's requirements.

Advantageously, the adjusting means comprise an adjusting screw 22 that is screwed in a suitable threaded hole of the lever 7, the seat 11 being formed at an end of the adjusting screw 22 facing the transmission portion 8.

The seat 11 is preferably funnel-shaped such as to facilitate the proper positioning and mutual engagement of the seat 11 of lever 7 with the second end 10 of the transmission portion 8, when the lever 7 shifts from the angular collapse stroke C to the rest position R.

According to an embodiment, there are provided elastic means acting between the support structure 2 and the lever 7, such as to hold the lever 7 elastically in the rest position R. Preferably, a helical torsion spring 23 is arranged in an annular seat 24 obtained in the lever 7 about a hole 25 to house the pin 26. A first end 23*a* of the helical spring 23 rests against a wall of a recess 23*b* of the annular seat 24 of lever 7 and a second end 23*c* of helical spring 23 rests against a suitable seat 23*d* of the support structure 2.

The helical spring 23 pushes the lever 7 elastically in the direction of the angular actuation stroke A and a second spring 27 (FIG. 7) pushes the piston 6 in an end-of-stroke position thereof corresponding to the rest position of lever 7, thereby counteracting the thrust of the helical spring 23. The force produced by the second spring is greater than the force of the first spring, in order to ensure that, when the lever 7 has not been actuated, the piston 6 remains in its end-of-stroke position and the lever 7 remains in its rest position R.

Figure 4:
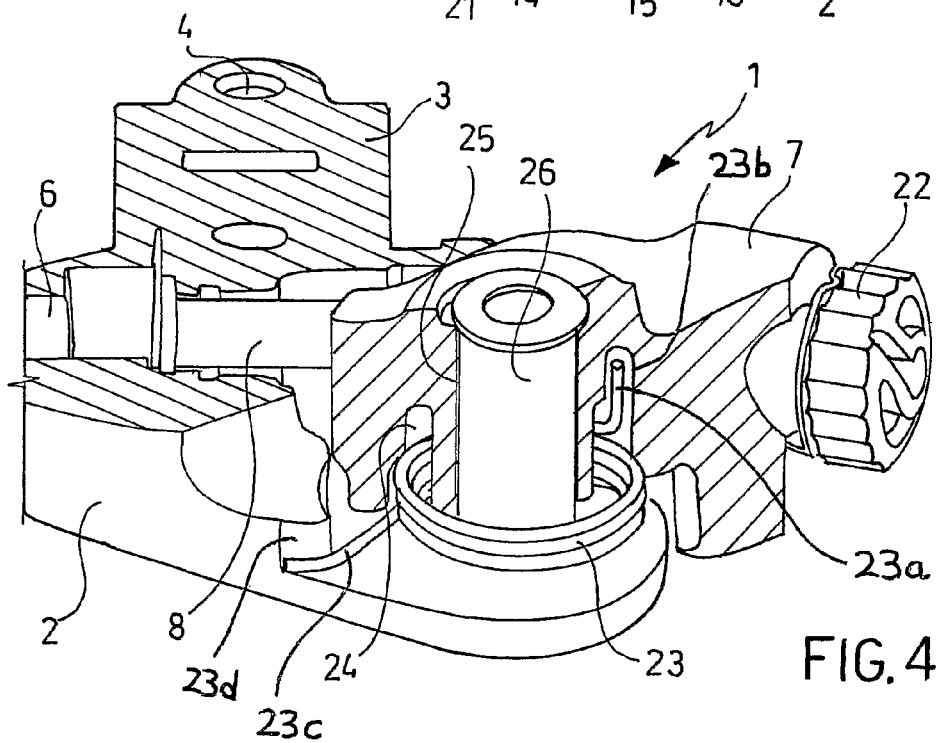
Figure 7:
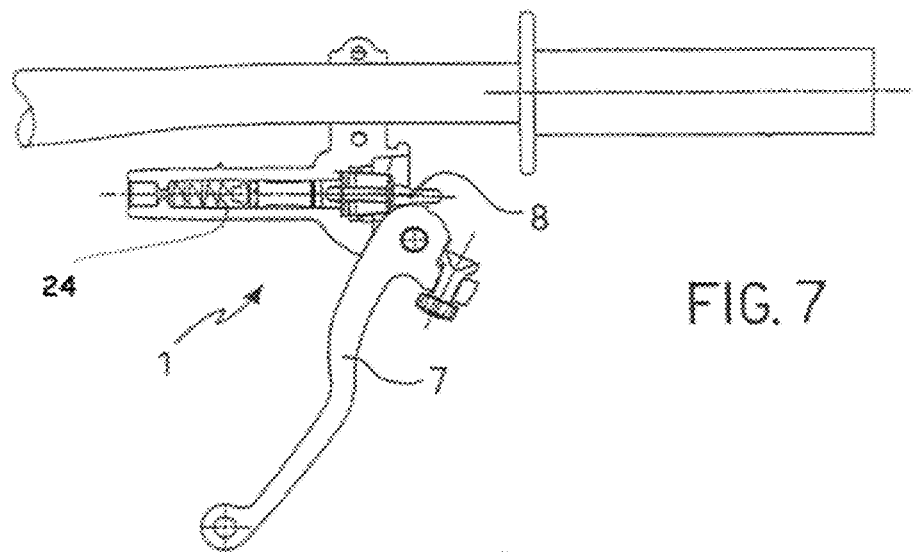
FIGS. 5, 6 and 7 illustrate the control lever device in three operating positions.
Figure 6:
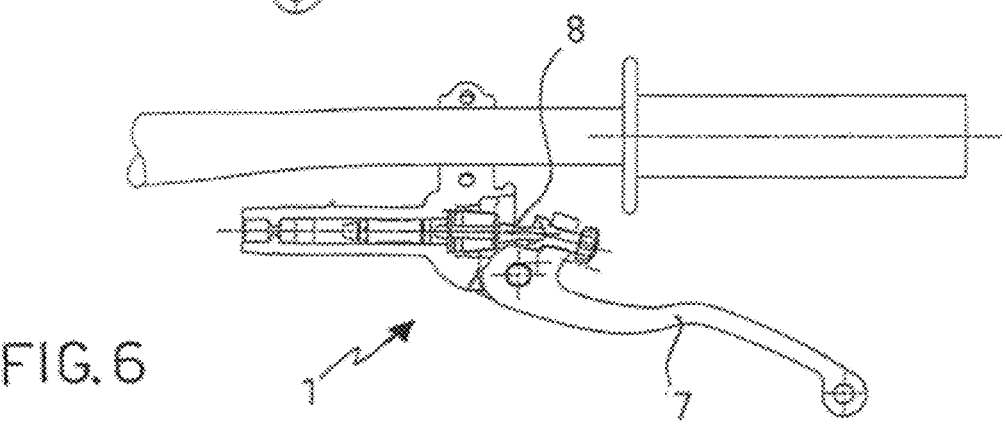
Figure 5:
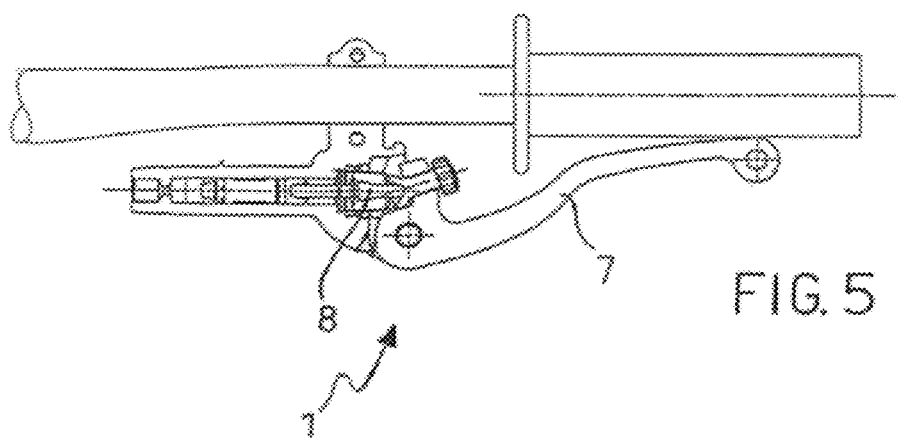

With particular reference to the FIGS. 4, 5 and 6 the operation of the control lever device according to the invention will be described below.

During normal operation of the device and in the absence of a manual actuation of the same, the helical spring 23 pushes the lever 7 elastically against the transmission portion 8, the funnel shape of the seat 11 of lever 7 ensuring the perfect mutual positioning of the lever 7 relative to the transmission portion 8.

Following a manual actuation of the lever 7, the latter is also displaced in the direction of actuation A, thereby also displacing the transmission portion 8 which transmits the movement of lever 7 to the piston 6. Piston 6 is then displaced from its end-of-stroke position to a work position to actuate either the clutch or the brake being hydraulically connected thereto.

Upon an accident or a simple fall of the motorcycle causing the lever 7 to move in the direction opposite to that provided for actuating the brake or clutch, the lever 7 enters its angular collapse stroke C and, at the same time, separates the seat 11 from the transmission portion 8. The transmission portion 8 is elastically held in position due to the gasket 14 of the cylinder-piston unit. The movements and impacts, particularly those transversal to the plane in which the lever 7 can be rotated are transmitted from the lever 7 only to the support structure 2 without acting on the transmission portion 8, which is then unloaded.

After the fall, when the motorcycle handlebar is no longer resting on the ground, the helical spring 23 takes the lever 7 again to the rest position R and the seat 11 of the lever engages the free end of the transmission portion 8, which is elastically positioned due to the elastic gasket 14 of the cylinder-piston unit.

As may be appreciated from the description above, the device according to the invention has a number of advantages.

It avoids any damages to the transmission portion and the piston following a severe impact against the control lever.

Furthermore, the device has a simple structure with a few pieces, the transmission portion does not require complex mechanical processing and strict size tolerances.

In the case of damage, it is sufficient to replace the lever without having to replace the entire lever device or at least the transmission portion and the cylinder-piston unit, as with the prior art devices.

A similar effect, which though being less advantageous than that obtainable with the device described so far is however very advantageous compared to the prior art can be achieved by means of a control lever device for vehicles, comprising:

a support structure with means for connecting the device to a handlebar;

a cylinder-piston unit connected to the support structure;

a lever being pivotally connected to the support structure along an angular actuation stroke extending from an angular rest position of the lever in a first direction of rotation and along an angular collapse stroke extending from said angular rest position in a second direction of rotation, opposite the first direction;

a transmission portion being associated with the lever device such as to transmit the movement of the lever along the angular actuation stroke to the cylinder-piston unit, wherein the transmission portion is arranged relative to the piston-cylinder unit such that, when the lever is in the angular collapse stroke, the transmission portion is separated from the cylinder-piston unit, such that a force acting on the lever cannot be transmitted to the cylinder-piston unit therefrom.

In this alternative embodiment, the protection of the cylinder-piston unit in case of accident takes place by separating the transmission portion from the piston. It is thereby obtained that the transmission portion, since it does not rest against the piston, cannot counteract any force applied on the lever. Consequently, this force is mainly transmitted to the support structure and not the transmission portion. Furthermore, the piston is effectively separated from the transmission portion and the lever, and accordingly, from any violent movement of the same.

What is claimed is:

1. A control lever device for vehicles, comprising:
   a support structure with means for connecting the device to a handlebar;
   a cylinder-piston unit connected to the support structure;
   a lever pivotally connected to the support structure by means of a pivot pin and adapted to rotate about said pivot pin along an angular actuation stroke extending from an angular rest position of the lever in a first direction of rotation, said lever being further adapted to rotate about said pivot pin along an angular collapse stroke extending from said angular rest position in a second direction of rotation, opposite the first direction;
   a transmission portion arranged between the lever and the cylinder-piston unit in a manner to transmit the movement of the lever along the angular actuation stroke to the piston of the cylinder-piston unit;
   wherein the transmission portion is arranged relative to the lever such that, when the lever is in the angular actuation stroke, the lever abuts against the trans-mission portion and when the lever is in the angular collapse stroke, it is separated from the transmission portion;
   wherein the transmission portion comprises a first end in permanent contact with a piston of the piston-cylinder unit and a second end which abuts against a seat of the lever, when the lever is in the angular actuation stroke; and further comprising
   an elastic gasket engaging the support structure and the transmission portion for holding the transmission portion against the piston in a preset position when the lever is in the angular collapse stroke, disengaged from the transmission portion;
   guide means to facilitate the proper mutual positioning of the seat of the lever and the second end of the transmission portion, when the lever shifts from the angular collapse stroke to the rest position, and
   elastic means acting between the support structure and the lever such as to hold the lever elastically in the rest position.

2. The device according to claim 1, wherein when the lever is in the angular collapse stroke, a force applied on the lever cannot be transmitted from the lever by means of direct contact to the transmission portion.

3. The device according to claim 1, wherein when the lever is in the angular collapse stroke, it is separated from the transmission portion such that a force applied on the lever is transmitted to the support structure thereby bypassing the transmission portion.

4. The device according to claim 1, wherein when the lever is in the angular actuation stroke, it rests against the transmission portion to allow said transmission of the movement of the lever to the cylinder-piston unit.

5. The device according to claim 1, wherein the transmission portion is connected to the support structure in a position away from said connecting position of the support structure to the lever.

6. The device according to claim 1, wherein said elastic means are provided by an elastic gasket of the cylinder-piston unit.

7. The device according to claim 1, wherein said guide means comprise a funnel-shaped seat.

8. The device according to claim 1, wherein said elastic means comprise a first spring acting directly between the support structure and the lever pushing the lever in the direction of the angular actuation stroke and a second spring pushing the piston of the cylinder-piston unit in an end-of-stroke position corresponding to the rest position of the lever, thereby counteracting the thrust of the first spring.

9. The device according to claim 1, comprising adjusting means suitable to adjust the relative position between the seat of the lever and the lever itself, such as to be able to adjust the angular rest position of the lever.

10. The device according to claim 1, wherein said adjusting means comprise an adjusting screw in a threaded hole of the lever, wherein said seat is formed at an end of the adjusting screw.

* * * * *